Oct. 10, 1939.  J. M. McENTEGART  2,175,477
PARACHUTE DEVICE
Filed April 23, 1937
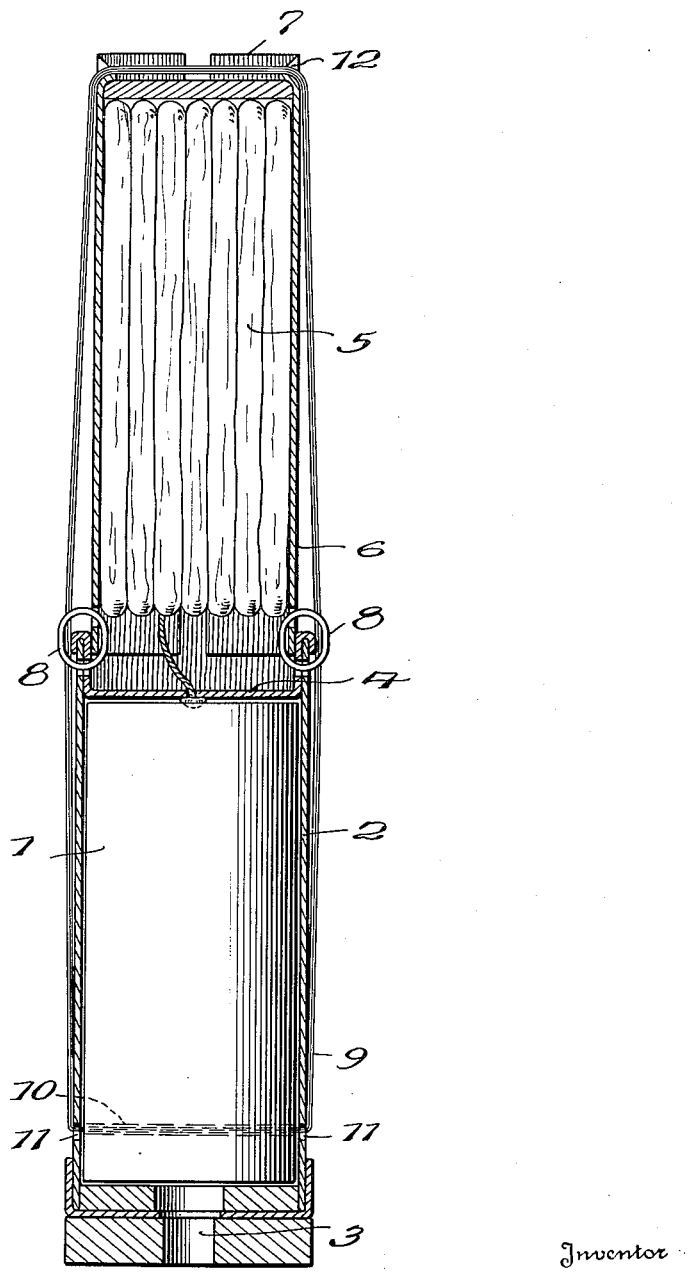
Inventor
James Mathews McEntegart,
By K. P. McElroy
Attorney Patented Oct. 10, 1939

2,175,477

UNITED STATES PATENT OFFICE 2,175,477

PARACHUTE DEVICE

James Mathews McEntegart, Ardrossan, Scotland, assignor to International Flare-Signal Company, a corporation of Ohio Application April 23, 1937, Serial No. 138,663
In Great Britain April 30, 1936

4 Claims. (Cl. 102—24)

This invention relates to parachute signal or illuminating devices of the type adapted to be projected to or released at a height in the air and comprising a signal or illuminating composition attached to a parachute serving the purpose of delaying its descent to the ground.

Parachute signal devices have been constructed in the form of a cylindrical casing or barrel in which the signal candle and the folded or rolled parachute were packed, and from which they were propelled by suitable means when the device was used, this casing or barrel being retained at the place from which the signal candle and parachute were fired.

Such devices have several disadvantages. As the parachute commences to free itself as soon as the cartridge is fired, the signal cannot be projected to any considerable height above the ground, and is therefore unsuitable for use as a ground signal except in forms designed to burn for a relatively short time. When the cartridge is fired from a fast-moving aeroplane, there is a danger of entanglement of the opening parachute with some part of the aeroplane or even destruction of the parachute by the violence of its opening when traveling at high speed through the air. In a modification the flare and the parachute are packed in a casing which is itself adapted to be projected to or released at a height, and from which the parachute and flare are expelled after a suitable interval. In this modification the parachute casing falls freely to the ground, and may cause damage when dropped from a considerable height.

An improvement has been proposed in British specification No. 300,217 wherein the parachute container consisted of a number of small detachable parts enclosing it, and the integrity of this container was preserved by retaining means adapted to be destroyed by the combustion of the signal candle after a predetermined time. The retaining means consisted of a string passing round the detachable parts of the parachute casing and through the signal candle at such a position that the string would be burned through and the parachute thereby released after the signal candle had burned for a period corresponding to some desired time of free fall.

In this form of construction, all that falls to the ground is a number of small pieces of light metal or other material, instead of a single relatively heavy case. However, it is desirable that even the slight danger attendant on the release of these pieces of the casing from a height should be avoided; and the present invention is designed to provide a method of avoiding that defect.

To devise an arrangement whereby the casing is carried by the parachute is a matter of difficulty, if the casing is hung below the flare it throws an unwanted shadow, if it is hung above the flare it is liable to cause undesirable eddies in the hot vapours which rise from the candle, which eddies cause the parachute to oscillate. Any weight on the fabric of the parachute is liable to distort it and impair its efficiency.

This invention has as an object to devise an arrangement whereby the casing can be carried by the parachute after the parachute has been opened without any of the undesirable results mentioned above. A further object is to devise such an arrangement whereby the casing acts as a flight stabiliser.

These objects are accomplished by the following invention. A parachute device, in particular a parachute flare signal device in which the flare signal and the encased parachute are projected to or released at a height together and the parachute is freed only after a predetermined period of free fall, includes a parachute casing constructed in separable portions which are permanently articulated to the butt of the flare signal or other casing, i. e. the end to which the parachute is attached, so that when the parachute casing opens and frees the parachute no part of this casing can become detached and fall freely to the ground. The invention is applicable in particular to parachute flare signal devices otherwise constructed in accordance with British specification No. 300,217.

One method of putting the invention into effect will be described with reference to the accompanying drawing, which is a sectional elevation of the device. This drawing represents the combined signal candle and cased parachute in the form in which the assembly is projected from a firearm or discharge tube. The flare candle 1 is encased in a metal or reinforced paper casing 2, and is securely retained in the casing by a deep sealing disc and turnover 4, which also serves to anchor the parachute cord to the flare candle. The folded parachute 5 is encased between two semi-cylindrical pieces of metal 6 hinged to the turnover by rings 8. Looped metal strips may be used in place of rings. These semi-cylindrical metal shields together form a complete casing for the parachute, and are held in position by a heat-destructible retaining means 9 of wire, string, cord, tape or the like, which passes through a hole or channel in the flare signal candle, ports 11 being provided in the casing for this purpose. The parachute is retained longitudinally in its casing by a top cap 7 which is positioned by depressions 12 in the shields, the depressions also serving as guides for the retaining cord.

When the assemblage as shown is ejected from the firearm or discharge tube the flare candle is ignited through the ignition passage 3 by the flame from the propelling charge. After it has burned for a period dependent on the distance of the passage 10 from the point of initial ignition of the candle, the retaining means is burned through and the semi-cylindrical shields thereupon fall back, releasing the parachute, and remain attached to the signal casing.

When the assemblage is projected otherwise than by a flame-producing propelling charge, a match-head and striker or similar igniting device adapted to function on discharge of the assemblage, is fitted to the ignition end of the flare candle.

The separable portions of the parachute casing are preferably so formed that when the parachute is released they open out to form a flight stabilising structure. Thus for example they may be so formed that they baffle part at least of the current of hot gases rising from the flare. Preferably the separable portions of the parachute casing are constructed in the form of hinged segments of a cylinder which, after they have opened, extend outwardly from the butt of the flare signal as regularly spaced radial vanes. The segments preferably are allowed to open out to such an extent that they are inclined upwardly at a small angle to the horizontal. In this form of the invention the separable portions of the parachute casing may operate when open to deflect from the parachute some of the current of hot air generated by the flare.

I have found that parachute signal flares constructed according to this preferred form of the invention are much more steady in flight, even in a high wind, than parachute flares of known types. These tend to oscillate on account of rhythmic spilling of hot air from the parachute, and produce shadow movements on the ground that confuse an observer and detract from the usefulness of the flare as an illuminant.

As many apparently widely different embodiments of this invention may be made without departing from the spirit and scope thereof, it is to be understood that I do not limit myself to the specific embodiments thereof except as defined in the appended claims.

I claim:

1. A parachute flare signal device, comprising a parachute, a flare signal, means attaching said flare signal to said parachute, a casing constructed of separable sections for substantially enclosing said parachute, means for permanently articulating said casing to said flare signal, means for holding said casing in parachute-retaining position, said device being so constructed and arranged that burning of said flare signal will disable said last-mentioned holding means and permit said casing to open out to release said parachute and form flight stabilizing members.

2. A parachute flare signal device, comprising a parachute, a flare signal including a candle and having an ignition end, means attaching said flare signal to said parachute, a casing constructed of separable sections for substantially enclosing said parachute, means for permanently articulating said casing to said flare signal, means for holding said casing in parachute-retaining position, said holding means being so located with respect to said ignition end and said device being so constructed and arranged that burning of said flare signal will disable said last-mentioned holding means and permit said casing to open out to release said parachute a predetermined time after ignition of said candle.

3. A parachute flare signal device, comprising a parachute, a flare signal having an ignition end, means attaching said flare signal to said parachute, a casing constructed of separable sections for substantially enclosing said parachute, means for permanently articulating said casing to said flare signal, heat destructible means positioned about said separable sections, and holding the casing in parachute-retaining position, said heat destructible means passing through said flare signal adjacent said ignition end of the flare but spaced therefrom a predetermined distance, whereby the burning of the flare signal will disable the heat destructible means and permit the casing to open out to release said parachute.

4. A parachute flare signal device, comprising a parachute, a flare signal including a candle and having an ignition end, means at the opposite end for attaching said flare signal to said parachute, a casing constructed of separable sections for substantially enclosing said parachute, means for permanently articulating said casing to said flare signal, means passing through said candle for holding said casing in parachute-retaining position, said holding means being so located with respect to said ignition means that burning of said flare signal will disable said holding means and permit said casing to open out releasing said parachute a predetermined time after ignition of said candle.

JAMES MATHEWS McENTEGART.